(12) United States Patent
Schellekens et al.

(10) Patent No.: US 7,728,075 B2
(45) Date of Patent: Jun. 1, 2010

(54) COATING COMPOSITION

(75) Inventors: Johannes Wilhemus Maria Schellekens, Halsteren (NL); Martin Bosma, Arnhem (NL); Freddy Gerhard Hendrikus Van Wijk, Dieren (NL); Paul Marie Vandevoorde, Essen (BE)

(73) Assignee: Nuplex Resins B.V., Bergen Op Zoom (NL)

( * ) Notice: Subject to any disclaimer, the term of this patent is extended or adjusted under 35 U.S.C. 154(b) by 480 days.

(21) Appl. No.: 10/554,330

(22) PCT Filed: Apr. 23, 2004

(86) PCT No.: PCT/EP2004/004384

§ 371 (c)(1),
(2), (4) Date: May 10, 2006

(87) PCT Pub. No.: WO2004/094515

PCT Pub. Date: Nov. 4, 2004

(65) Prior Publication Data

US 2006/0281862 A1 Dec. 14, 2006

Related U.S. Application Data

(60) Provisional application No. 60/479,099, filed on Jun. 17, 2003.

(30) Foreign Application Priority Data

Apr. 24, 2003 (EP) .................................. 03076233

(51) Int. Cl.
*C08L 75/14* (2006.01)
*C08F 20/00* (2006.01)
(52) U.S. Cl. .................. 525/124; 525/125; 525/440.01; 525/445
(58) Field of Classification Search .................. 525/123
See application file for complete search history.

(56) References Cited

U.S. PATENT DOCUMENTS

| 4,877,455 A | * | 10/1989 | Brauer et al. ............... 106/244 |
| 4,960,828 A | * | 10/1990 | Higuchi et al. .............. 525/162 |
| 5,523,164 A | | 6/1996 | Shibato et al. .............. 428/461 |
| 5,965,670 A | | 10/1999 | Mauer et al. ................. 525/398 |
| 5,981,080 A | | 11/1999 | Rockrath et al. |
| 6,166,151 A | * | 12/2000 | Hariharan et al. ........... 525/463 |

FOREIGN PATENT DOCUMENTS

| CN | 1197473 A | 10/1998 |
| JP | 2242867 A | 9/1990 |
| WO | WO 95/31513 | 11/1995 |

OTHER PUBLICATIONS

International Search Report and the Written Opinion of the International Searching Authority, Mailed Aug. 6, 2004, for International Application No. PCT/EP2004/004384 (7 Pages Total).

* cited by examiner

*Primary Examiner*—Randy Gulakowski
*Assistant Examiner*—Kyle Baumstein
(74) *Attorney, Agent, or Firm*—Coraline J. Haitjema; David P. Owen; Howrey LLP

(57) ABSTRACT

The invention relates to a high gloss car wash-resistant coating composition comprising a hydroxyl-functional binder and a cross-linker reactive with the hydroxyl groups of the binder and a method to prepare such a car wash-resistant coating. The invention further relates to the use of said coating composition, as a pigment-free top coat or a clear coat, in the finishing and refinishing of articles, for example motorcycles, cars, trains, buses, trucks, and aeroplanes. The coating composition after curing forms a coating having an initial gloss of at least 81 GU and a loss of gloss (LoG) of less than 0.18, the loss of gloss being determined by the formula (I): $LoG=A+B \cdot E' \cdot (X)^{-1} \cdot 10^{(C \cdot \Delta Tg)} + D \cdot (E')^{-0.5}$; wherein $A=0.0132$, $B=1.0197$, $C=0.0113$, and $D=0.0566$, $E'$ reflects the tensile storage modulus at 40° C. in GPa, $\Delta Tg$ the width of the glass transition temperature in ° C., and X the cross-link density parameter in kPA/K all three parameters determined in a DMTA test at 11 Hz and a heating rate of 5° C./min.

21 Claims, No Drawings

COATING COMPOSITION

This application is a §371 U.S. national phase application of International Application Number PCT/EP2004/004384, filed Apr. 23, 2004, and claims priority to European Application No. 03076233.0, filed Apr. 24, 2003 and U.S. Provisional Application No. 60/479,099, filed Jun. 17, 2003, the entire contents of which are incorporated by reference herein.

The invention relates to a high gloss car wash-resistant coating composition comprising a hydroxyl-functional binder and a cross-linker reactive with the hydroxyl groups of the binder and a method to prepare such a car wash-resistant coating. The invention further relates to the use of said coating composition as a pigment-free top coat or a clear coat in the finishing and refinishing of articles, for example motorcycles, cars, trains, buses, trucks, and aeroplanes.

An important feature of a coating is the gloss. The gloss of a coating reduces in time, resulting in an unattractive dull surface. In particular, car coatings suffer significantly from a car washing treatment. Hence there is a continuous desire to improve the car wash resistance of coating compositions. Evidently, the desire to improve the washing resistance similarly applies in general, for example to coating compositions for other applications such as motorcycles, trains, etc. Car wash resistance is expressed as a loss of gloss determined in a defined car wash experiment (Renault specification RNUR 2204—C.R. PO N° 2204) described below. The loss of gloss is determined by measuring the gloss using reflected light in the method in accordance with ISO 2813.

A coating composition comprising a hydroxyl-functional binder and a cross-linker reactive with the hydroxyl groups of the binder is known from e.g. DE-A-43 10 414 and DE-A42 04 518. Prior art coating compositions are formulated to achieve a high cross-link density of the resulting cured coating. In the case of binders intended for cross-linking with a curing agent, this means that the number of reactive groups in the binder, such as the number of hydroxyl groups, should be high. A disadvantage of the use of binders having a high number of hydroxyl groups is that the coatings obtained are hydrophilic, leading to insufficient acid and water resistance. Because of this these coatings are not suitable for example as car coatings. On the other hand, at a low number of hydroxy groups the car wash resistance would be undesirably low.

WO 96/34905 discloses a car wash-resistant coating composition comprising an acrylic polyol polymer, an acrylosilane, and a carbamoyl triazine compound. Such compositions comprise undesired siloxane compounds. This coating composition has the disadvantage that it contains rather expensive components such as the acrylosilane component. Further, silanes are extremely sensitive to water and hard to mix with a number of usual coating components, which may give rise to gelation and/or phase separation, resulting in hazy films with a low gloss. Besides, siloxanes have a low refractive index, resulting in a low gloss and siloxanes are known to have a negative effect on recoatability and require the addition of polar additives to solve this. This makes the coating more complex, more difficult to formulate, and more expensive.

WO 99/33915 discloses a coating composition comprising an acrylic polyol polymer, an aminoplast, and a carbamoyl triazine compound. The disclosed cured coating compositions have relatively poor car wash resistance and show considerable loss of gloss when subjected to a car wash operation.

It has further been described to make coatings car wash-resistant by including inorganic additives like polysiloxane binders in the coating composition or by using inorganic nanoscopic particles, the nanoscopic particles having a diameter between 1 and 1,000 nm. A disadvantage related to these systems is their difficult and expensive processing and high materials cost. There is therefore a further desire to make car wash-resistant coatings having a high car wash resistance substantially without such inorganic additives.

It is noted that car wash resistance is very different from dry scratch resistance such as disclosed in, e.g., WO 98/40442 and WO 98/40171. Cured coatings optimised to have a very good dry scratch resistance may not have optimal car wash resistance and visa versa.

There is therefore a desire for a coating composition that after curing provides a cured coating, in particular a pigment free top coating, with a good car wash resistance and a high gloss, said coating composition having a simple formulation comprising a hydroxyl-functional acrylic or polyester binder and preferably a generally used cross-linker such as an isocyanate-functional, a functionalised melamine or aminoplast cross-linker. In particular, there is a desire for a coating composition that can achieve the high car wash resistance at lower cost and substantially without the special additives used in the prior art like polysiloxane binders or inorganic nanoscopic particles.

According to the invention, a coating composition for the manufacture of a car wash-resistant coating is provided which comprises at least one hydroxyl-functional binder selected from the group of hydroxyl-functional acrylic binders and hydroxyl-functional polyester binders and one or more cross-linkers reactive with the reactive groups of the binder, wherein the binder and cross-linkers are selected such that, after curing to a coating, the coating has an initial gloss of at least 81 GU and a loss of gloss (LoG) of less than 0.18, the loss of gloss being determined by the formula (I)

$$\mathrm{LoG} = A + B \cdot E' \cdot (X)^{-1} \cdot 10^{(C \cdot \Delta Tg)} + D \cdot (E')^{-0.5} \qquad (I)$$

wherein A=0.0132, B=1.0197, C=0.0113, and D=0.0566, E' reflects the tensile storage modulus at 40° C. in GPa, ΔTg the width of the glass transition temperature in ° C., and X the cross-link density parameter in kPa/K, all three parameters determined in a DMTA test at 11 Hz and a heating rate of 5° C./min.

The inventors have investigated the loss of gloss of a coating in a car washing operation and found that the damage caused by car washing is of mechanical origin and not of chemical origin and is accurately described and determined by the formula (I) using mechanical parameters only. Car wash damage to cured coating compositions was found to be caused by mechanical forces in combination with the presence of dirt particles sticking to the coating surface and/or brought to the coating surface by the use of recycled wash water that still contains tiny, often hard, inorganic dirt particles. In particular in today's car wash installations where plastic brushes are mounted on a revolving head, conditions are quite severe. The brushes hammer on the surface of the coatings, the tiny dirt particles further enhancing the pressure of the impacting brushes through their small surface area (high hardness, sharp edges), causing damage in the coating that is observed as loss of gloss.

It is the inventors' accomplishment to identify those parameters, in particular the tensile storage modulus E', the width of the glass transition temperature ΔTg, and the cross-link density X, that uniquely and precisely determine and define the loss of gloss in car washing conditions and their mutual relation as expressed in the mathematical formula (I). The calculated LoG value accurately describes the observed loss of gloss as a result of a car wash treatment as defined below. The formula solves the problem that seemingly contradicting effects on car wash resistance are observed when varying the composition of a car wash-resistant coating composition. E.g., sometimes a high cross-link density (X), appears to be favoured for obtaining a good car wash resistance, whereas on the other hand a high cross-link density (X) may also result in a broad Tg (ΔTg), which is unfavourable for a good car wash resistance. The invention allows a person skilled in the art to select the coating composition components on the basis of the physical properties of such components in view of achieving selected values on the specified parameters in the cured coating such that the condition in that specified formula is met. Specifically, for making the coating composition a person skilled in the art selects from the wide range of available components those components that after curing result in a balanced combination of a) a relatively low ΔTg, b) a relatively high cross-link density parameter X, and c) a relatively low tensile storage modulus E' measured at 40° C. On the basis of his general understanding of physical properties of chemical compounds, the description of the present invention, and some routine experimentation, the skilled person can choose such components in the coating composition as will result in a relatively low ΔTg, a relatively high X, and a relatively low E', and so arrive at the values of the parameters required to meet the formula according to the invention.

The parameters in the formula are not just fit parameters but represent real physical characteristics relating to the internal structure of the coating. A narrow ΔTg is characteristic for coatings with a homogeneous cross-link network. Characteristic for such a homogeneous network is that the network chains between cross-links are uniform in nature and that the cross-links are homogeneously distributed over the cured coating composition. It was found that a coating comprising only one cross-link network is preferred over a coating comprising two co-existing networks. In view of that, it is also preferred to use binders and cross-linkers that do not provide a significant amount of self-cross-linking in the composition. Preferably, the coating composition according to the invention results in a coating wherein the width. of the glass transition temperature of the coating is less than 80° C., more preferably less than 75° C., most preferably less than 65° C.

Although a small ΔTg is generally preferred, it is a merit of the present invention that a low loss of gloss can also be achieved for those coating compositions resulting in coatings having a relatively broad ΔTg that would otherwise be disqualified for car wash resistance coatings. For example, amino resins are commercially attractive as coating material because they are inexpensive and are one component system, meaning that the binder and the cross-linker can be pre-mixed in a single coating composition and cured for example at elevated temperature. However, amino resin based crosslinkers are self-cross-linking systems and therefore will result in a broader Tg after curing and result in a higher LoG value than when no self-cross-linking would occur. The car wash resistance of such systems is less than desired. Using formula (I) according to the invention, the negative effect of the relatively broad ΔTg can be compensated by choosing the composition of the amino resin such as to have an adequately low tensile storage modulus and/or a high cross-linking density. In this way according to the invention a one component amino resin coating composition has been made available having a good car wash resistance.

Another way to positively influence the ΔTg is by using extended hydroxyl groups in the hydroxyl-functional binder(s). Extended hydroxyl groups provide extra distance between two polymer chains of the hydroxyl-functional binders, which, after curing with a cross-linker, will be further apart than when hydroxyl groups are used that are close to the backbone. As the average distance between the hydroxyl groups on the hydroxyl-functional binder is relatively large, an increased distance between two cross-linked polymer chains will result in a more homogeneous polymer network. For acrylic hydroxyl-functional binders the number of atoms between the hydroxyl group and the acrylic backbone must therefore be large. This can for example be achieved by chain extension, for example by reacting the binder with a chain extender. A homogeneous network, characterised by a narrow ΔTg, results in an even distribution of the applied mechanical stress over a large fraction of the polymer network chains and thus helps to avoid over-stressed network chains.

It is noted that the binder can be one or more different types of binders, so "the binder" can be read as "the at least one binder". Further, as described above, the binder may be modified by reacting with a chain extender. So where reference is made to total solids, this implies the total of the binder, optionally modified with chain extender, and the cross-linker.

The inventors have established that under the acting forces during a car wash test, in principle three different types of scratches can occur in the coating layer: elastic scratches, which disappear immediately after the applied force is removed, and plastic scratches and brittle (fracture) scratches that do not disappear after the applied force is removed. A plastic scratch will have the biggest influence on the amount of scattered light, which is observed as a significant loss of gloss and in general is not appreciated in the known and/or commercial high-gloss coating applications. Elastic scratches do not influence the gloss of the coating and the effect of brittle scratches is in-between. Accordingly, the inventors have established that it is important to reduce the amount of plastic scratches at the expense of an increase in the amount of elastic scratches, or even at the expense of an increase in brittle scratches.

The occurrence of plastic scratches can be minimised by increasing the cross-link density of the coating. A high cross-link density can be achieved by increasing the number of hydroxyl groups. However, if no special attention is paid to the cross-link efficiency, binders having extremely high hydroxyl numbers may have to be used to achieve a high effective cross-linking level. This has the disadvantage that the coating compositions and the resulting coatings are hydrophilic, leading to insufficient acid and water resistance. It is therefore required to increase the cross-link efficiency of the curing coating composition. The cross-link efficiency is a measure of the probability for a hydroxyl group on the binder to actually react with the cross-linker. Preferably, the coating composition after curing to a coating has a cross-link efficiency $E_{XL}$ of at least 0.3 U and a cross-link density parameter X of at least 50 KPa/K. Preferably, the cross-link efficiency $E_{XL}$ of the cured coating is at least 0.5 U, more preferably at least 0.7 U, even more preferably at least 0.9 U, and most preferably at least 1.0 U. It is further preferred that the cross-link density parameter X of the cured coating is at least 65 KPa/K, more preferably at least 90 KPa/K, even more preferably at least 110 KPa/K, and most preferably at least 150 KPa/K.

It was found that when low polar and low Tg parts are present in the coating composition, a higher cross-linking efficiency can be achieved. It is believed that the local mobility in curing hydroxyl-functional binder/cross-linker moiety prolongs the time for the reactive groups on the binder and the cross-linker to find each other and form a covalent bond (cross-link). Another way to increase the cross-link density is by using hydroxyl groups that are easily accessible, i.e. not sterically hindered by neighbouring groups. Therefore, flexible, protruding hydroxyl or cross-linking groups are preferred for obtaining a high cross-link density and a high cross-link efficiency. The chemical parameters carbon length (CL), hydroxyl length (OHL), and low polar fraction of low Tg monomers (LPF) as described below can be used to further tune the cross-link density of the cured coating composition to meet the requirement according to formula (I).

Further, it has been found that it is advantageous to have a low tensile storage modulus of the coating to avoid the occurrence of brittle scratches. Furthermore, such a low tensile storage modulus can help to make plastic scratches disappear. The inventors have found that the value of E' at 40° C. as determined in a DMTA-test at 11 Hz is a good measure of the tensile storage modulus of the coating under car wash conditions. A low value of E' at 40° C. of the cured coating composition can be achieved by introducing local soft spots in the polymer network. For acrylics these soft spots can be introduced using low-Tg, non-functional monomers, and for polyester hydroxyl-functional binders these soft spots can be introduced using flexible parts in the main polymer chain: using monomers with at least three consecutive hydrocarbons in between the functional groups. For both acrylic and polyester binder based coating formulations soft spots can be introduced by using a cross-linker that has at least three consecutive hydrocarbons in between the groups reactive with the hydroxyl groups on the hydroxyl-functional binders. Further, the tensile storage modulus properties can be further tuned by appropriate selection of the hydroxyl length (OHL) and the low polar fraction of low Tg monomers (LPF) for acrylic binder based coating compositions, and of the carbon length (CL) for polycondensation (polyester) based coating compositions as described below. Although, in principle, the tensile storage modulus can vary in a wide range as long as the condition of formula (I) is met, the tensile storage modulus (at 40° C. and 11 Hz) is preferably chosen below 2.9 GPa. In view of avoiding brittle scratches the tensile storage modulus preferably is below 2.7 GPa, more preferably below 2.5 GPa, even more preferably below 2.4 GPa, most preferably below 2.3 GPa The tensile storage modulus preferably is at least 0.2 GPa.

For reasons other than car wash resistance, such as reparability of automotive clear coatings, it is preferred that the tensile storage modulus E' is at least 1.0 GPa, more preferably at least 1.3 GPa, most preferably at least 1.5 GPa.

In a first preferred embodiment of the coating composition according to the invention, resulting in high gloss car wash-resistant coatings, the at least one hydroxyl-functional binder is an acrylic binder, wherein the acrylic binder (1) comprises at least 20 wt % based on the total weight of the monomers of hydroxyl group-containing monomers selected from the group of primary hydroxyl group-containing monomers or hydroxylcycloalkyl group-containing monomers, (2) this acrylic binder comprises more than 10 mole % of monomers selected from the group of non-OH-functional low Tg monomers with a monomer Tg not exceeding 253K for acrylic non-OH-functional monomers, or not exceeding 293K for methacrylic or non-acrylic non-OH-functional monomers, and wherein (3) the average number of atoms between the polymeric backbone of the acrylic binder and the oxygen atom of the hydroxyl group is at least 6, and (4) the acrylic binder has an OHV value between 80 and 250 mg KOH/g.

In a second preferred embodiment of the coating composition according to the invention, also resulting in high gloss car wash-resistant coatings, the at least one hydroxyl-functional binder is a hydroxyl-functional polyester binder, the at least one cross-linker is an amino-functional cross-linker, an isocyanate-functional cross-linker, or a blocked isocyanate-functional cross-linker, wherein the binder and the cross-linker together amount to at least 90 wt % of the solids content of the coating composition and give a L1 value of less than 0.18, L1 being calculated according to formula (II):

$$L1 = A1 + A2 \cdot (Mn)^{-1} + A3 \cdot CL + A4 \cdot MF + A5 \cdot NCO + A6 \cdot CL \cdot (Mn)^{-1} + A7 \cdot (MF)^2 + A8 \cdot MF \cdot NCO \quad \text{(II)}$$

wherein Mn represents the number average molecular weight of all hydroxyl-functional binders in the composition, CL the carbon length, MF the weight fraction of the amino cross-linker on total solids in the coating composition, NCO is defined as the total concentration of NCO groups present in the cured coating composition expressed in mmole NCO groups/g, wherein $A1 = -0.474$, $A2 = 457$, $A3 = 0.343$, $A4 = 2.17$, $A5 = 0.205$, $A6 = -812$, $A7 = -2.37$, $A8 = -0.656$; and wherein the at least one hydroxyl-functional polyester binder has an OHV value between 50 and 350 mg KOH/g. Formula (II) enables the skilled man to select for polyester based coating compositions from the wide variety of possible components those components having the appropriate chemical composition to meet the criterion according to the formula of having a L1 below 0.18, which accurately corresponds with a low observed loss of gloss of less than 18%.

The inventors have found that good results can be obtained for a coating composition according to the first preferred embodiment invention, wherein the at least one binder is a hydroxyl-functional acrylic binder, if the at least one cross-linker is an amino-functional cross-linker or an isocyanate-functional cross-linker, wherein the binder and the cross-linker together amount to at least 90 wt % of the solids content of the coating composition and give a L2 value of less than 0.18, L2 being calculated according to formula (III)

$$L2 = B1 + B2 \cdot TG + B3 \cdot MW + B4 \cdot OHL + B5 \cdot LPF + B6 \cdot MF + B7 \cdot NCO + B8 \cdot TG \cdot OHL + B9 \cdot MW \cdot MF + B10 \cdot MW \cdot NCO + B11 \cdot OHL \cdot NCO + B12 \cdot (LPF)^2 + B13 \cdot OHL \cdot MF \quad \text{(III)}$$

wherein TG represent the weight average theoretical glass transition temperature of all acrylic binders, MW the weight average molecular weight of all hydroxyl-functional binders in the composition, OHL the weight averaged hydroxyl length of all hydroxyl-functional acrylic binders, LPF the weight-averaged low polar fraction of low-Tg monomers in the acrylic binder, MF the weight fraction of the amino cross-linker on total solids in the coating composition, NCO is defined as the total concentration of NCO groups present in the cured coating composition expressed in mmole NCO groups/g, $B1 = -1.0776$, $B2 = 0.00354$, $B3 = -0.0000818$, $B4 = 0.2728$, $B5 = -0.17266$, $B6 = 1.304$, $B7 = 0.1354$, $B8 = -0.000373$, $B9 = 0.000269$, $B10 = 0.00004066$, $B11 = -0.08487$, $B12 = 0.2878$, $B13 = -0.6037$, and wherein the OHV value of the at least one hydroxyl-functional acrylic binder is between 80 and 250 mg KOH/g. Formula (III) enables the skilled man to select for the formulation of acrylic based coating compositions from the wide variety of possible components those components having the appropriate chemical composition to meet the criterion according to the formula of having a L2 below 0.18, which accurately corresponds with a low observed loss of gloss of less than 18%.

In a preferred embodiment of the coating composition according to the invention both a hydroxyl-functional polyester binder and an acrylic binder are present, wherein the at least one cross-linker is an amino-functional cross-linker or an isocyanate-functional cross-linker, wherein both the polyester binder and the acrylic binder are present in more than 10 wt % of the solids content of the coating composition and give a L3 value of less than 0.18, L3 being calculated according to formula (IV)

$$L3 = C1 \cdot L1 + C2 \cdot L2 \quad (IV)$$

wherein C1 represents the total weight percentage of polyester binder, C2 the total weight percentage of the acrylic binder on the total solids content of binders in the coating composition, L1 is calculated according to formula (II) and L2 according to formula (III), wherein L1 is calculated as if no acrylic binder is present and L2 is calculated as if no polyester binder is present.

Coating compositions according to the invention as described above after curing result in a coating having a high gloss of at least 81 GU and an observed loss of gloss of less than 18% after the defined car washing treatment even without the special additives that are known in the prior art to produce an improved car wash resistance. Even better car wash resistance can be obtained in the coating composition according to the invention. Preferably, the observed loss of gloss of the cured coating is less than 17%, even more preferably less than 15%, still more preferably less than 14%, and most preferably less than 13%. In the best embodiments of the coating composition according to the invention an observed loss of gloss of less than 12% can be achieved. These very low observed loss of gloss values are achieved by tuning the composition parameters E', X and ΔTg according to the formula (I) to meet the corresponding calculated LoG value.

Although the special additives are not required to achieve the above-mentioned high car wash resistance with low loss of gloss, they may in principle be present in the coating composition to further improve the car wash resistance. However, it is nevertheless preferred that the coating composition according to the invention is substantially free of such additives. In particular, is preferred that the coating composition is substantially free of polysiloxane binders and/or of nanoscopic particles, in particular inorganic nanoscopic particles. As the envisaged use of the coating composition is primarily in clear coatings, it is further preferred that the coating composition is also substantially pigment-free. The coating composition according to the invention preferably is substantially siloxane-free and/or substantially acrylosilane-free and inorganic nanoscopic particles-free (less than 0.1 wt %) and still gives good car wash resistance. Substantially siloxane-free and substantially acrylosilane-free means that the amount of siloxane and acrylosilane compound is less than 5 wt %, preferably less than 3 wt %, more preferably less than 2 wt %, most preferably less than 1 wt % on the total coating composition. Substantially pigment-free means that the coating composition comprises substantially no pigment particles and/or substantially no aluminium particles, preferably less than 2 wt % on total composition, more preferably less than 1 wt %, even more preferably less than 0.5 wt %, and most preferably less than 0.3 wt %.

In view of ease of use in applying the coating compositions to a substrate to form a coating, it is a preferred that the coating composition is a liquid.

The invention further relates to suitable binders for use in the above coating composition as described in this application, where these binders are used in an amount of 40 to 90, preferably 50 to 80 wt %, more preferably 55 to 75 wt %, the weight percentages being based on binder+cross-linker=100 wt %.

A preferred coating composition is one wherein L1 is smaller than 0.17, more preferably L1 is smaller than 0.16, even more preferably L1 is smaller than 0.15, and most preferably L1 is smaller than 0.14.

A preferred coating composition is one wherein L2 is smaller than 0.17, more preferably L2 is smaller than 0.16, even more preferably L2 is smaller than 0.15, and most preferably L2 is smaller than 0.14.

A preferred coating composition is one wherein L3 is smaller than 0.17, more preferably L3 is smaller than 0.16, even more preferably L3 is smaller than 0.15, and most preferably L3 is smaller than 0.14.

Definitions of Parameters

The tensile storage modulus E' and the temperature at which this modulus reaches a minimum value are determined using dynamic mechanical thermal analysis (DMTA) measuring a free-standing cured coating with an average layer thickness between 30 to 50 μm and a standard deviation of the layer thickness less than 2 μm. To obtain a fully cured coating it is preferred that the coating is cured at a temperature of at least 60° C. DMTA is a generally known method for determining characteristics of coatings and is described in more detail in T. Murayama, *Dynamic Mechanical Analysis of Polymeric Material* (Elsevier: New York 1978) and Loren W. Hill, *Journal of Coatings Technology*, Vol. 64, No. 808, May 1992, pp. 31-33. More specifically, DMTA is performed using a modified Rheovibron (Toyo Baldwin type DDV-II-C) at a frequency of 11 Hz with a dynamic tensile strain of 0.03%. The temperature is varied between −50° C. and 200° C. at a heating rate of 5° C./min. All measurements are done in the tensile mode and at each temperature the tensile storage modulus E', the tensile loss modulus E", and tan−δ (tan−δ=E"/E') are determined. In the glass transition region E' decreases sharply. At temperatures above the glass transition temperature Tg but below the rubber to liquid transition temperature T-flow, E' has a local minimum ($E'_{min}$) at a temperature ($T_{min}$ in K), after which it increases with the temperature. The cross-link density parameter X is the ratio between this minimum tensile storage modulus $E'_{min}$ and temperature $T_{min}$ ($X = E'_{min}/T_{min}$) at which this modulus $E'_{min}$ is reached. The efficiency of cross-linking $E_{XL}$ is the ratio of the cross-link density parameter X to the hydroxyl value (OHv) of the binder ($E_{XL} = X/OHv$). The $E_{XL}$ is given in the unit U, wherein 1 U is defined as 1 KPa/K*g/mg KOH. In case more than one binder is used instead of the OHv the weight averaged hydroxyl value OHV described below is used.

The value of the glass transition temperature (Tg) and the width of the glass transition temperature (ΔTg) are obtained by fitting the experimental data of the loss factor (tan−δ) as a function of temperature with a double Gaussian curve:

$$\text{Tan} - \delta(T) = y_0 + K_1 \cdot \text{Exp}\left[-\frac{(T - T_{g1})^2}{2 \cdot w_1^2}\right] + K_2 \cdot \text{Exp}\left[-\frac{(T - T_{g2})^2}{2 \cdot w_2^2}\right]$$

wherein $y_0$, $K_1$, $T_{g1}$, $w_1$, $K_2$, $T_{g2}$, $w_2$ are constants and tan−δ (T) is the experimental data of tan−δ as a function of temperature T. In the fitting routine, the upper limit of the value of $K_2$ is $K_1/2$.

The temperature at which the fitted tan−δ curve (given by the formula above) reaches a maximum is taken as the glass transition temperature $T_g$. The value of $\Delta T_g$ is the width (in ° C.) of the fitted tan−δ peak at half height.

The layer thickness of the cured coating samples is determined using an inductive thickness gauge (Isoscope® MP, Fischer Instrumentation). The thickness is determined in at least five different spots on the sample and the average thickness is taken. The thickness of cured coatings that were too soft to prevent penetration of the measuring probe of the Isoscope® MP Instrument was checked by measuring the weight of the sample using a micro-balance (Mettler Toledo® AT201).

The hydroxyl value (OHv) is determined in equivalent milligrams of KOH in 1 gram of polyol in accordance with ISO 4629.

The molecular weight distribution is determined using gel permeation chromatography (GPC) on a Pl gel 5 μm Mixed-C column (from Polymer Laboratories) with tetrahydrofuran as the eluent. The weight-averaged molecular weight (Mw), the number average molecular weight (Mn), and the polydispersity Mw/Mn are determined from the measured molecular weight distribution calculated relative to a polystyrene standard.

If more than one hydroxyl-functional binder is used, the MW value for the car wash-resistant coating composition is calculated by taking the weight fractions of the binders based on binder solids (i.e. not taking the cross-linker into account). If βA denotes the weight fraction of hydroxyl-functional binder A and βB denotes the weight fraction of hydroxyl-functional binder B, etc. of a car wash-resistant coating composition containing two or more different hydroxyl-functional acrylic binders, such that βA+βB+ ... =1, the MW value of the car wash-resistant coating composition is then calculated as: MW=βA·MwA+βB·MwB+ ... , where MwA and MwB, etc. denote the Mw values of binders A and B, respectively.

The carbon length (CL) of the polyester binders is the weight fraction on total solids in a car wash-resistant coating composition of all carbon atoms of the binders and cross-linkers present in the form of hydrocarbon moieties containing at least four ($\geq 4$) consecutive carbon atoms in a continuous acyclic alkyl or alkylene chain, as measured across the longest possible path counted per monomer unit and per cross-linker unit. The parameter CL is expressed as a fraction (i.e. number of 0 to 1). The Carbon Length (CL) can be calculated using:

$$CL = \Sigma i 12 \cdot n_i \cdot w_i / M_i$$

Wherein:

$n_i$=number of consecutive carbon atoms according to the definition in monomer or crosslinker (or optionally chain extender) i $w_i$=weight fraction of monomer or crosslinker (or optionally chain extender) i in the coating composition (binder, crosslinker and optionally chain extender)

$M_i$=molecular weight of the monomer or crosslinker (or optionally chain extender) before polycondensation.

The sum is taken over all monomers, crosslinkers and optional chain extenders in the coating composition. For example, in 2-ethyl,2-butyl,1,3-propanediol n equals 7. In the formulas it is defined that all amino-based crosslinkers have zero carbon atoms according to the definition (n=0).

The amino cross-linker concentration (MF) is defined as the weight fraction of melamine cross-linker on total solids in the car wash-resistant coating composition. The parameter MF is expressed as a number of 0 to 1.

The total amount of urethane groups or urethane-forming groups in the coating composition (NCO) is defined as the total concentration of NCO groups present in the cured coating composition expressed in mmole NCO groups/g, wherein for the calculation of the concentration the molar mass of the NCO group (42) is taken, irrespective of whether the NCO group is present as a urethane, a urea, an allophanate etc. To avoid any doubt, urethane groups and urethane-forming groups optionally present in the hydroxyl-functional binder participate in the determination of the value of NCO. NCO groups may be present in the coating composition through the isocyanate-functional cross-linker and optionally in the hydroxyl-functional binder.

The weight-averaged theoretical glass transition temperature (TG) of the acrylic binders is defined as the calculated Tg of a binder based on the monomer composition according to the method described in D. W. van Krevelen, Properties of Polymers (3rd edition, Elsevier 1990). If more than one hydroxyl-functional binder is used, the TG value for the car wash-resistant coating composition is calculated by taking the weight fractions of the binders based on binder solids (i.e. not taking the cross-linker into account). If βA denotes the weight fraction of hydroxyl-functional binder A and βB denotes the weight fraction of hydroxyl-functional binder B, etc. of a car wash-resistant coating composition containing two different hydroxyl-functional acrylic binders, such that βA+βB+ ... =1, the TG value of the car wash-resistant coating composition is then calculated as:

$$1/TG = \beta A/TG-A + \beta B/TG-B$$

The weight-averaged hydroxyl value (OHV) of all hydroxyl-functional binders is determined as follows: If more than one hydroxyl-functional binder is used, the OHV value for the car wash-resistant coating composition is calculated by taking the weight fractions of the binders based on binder solids (i.e. not taking the cross-linker into account). If $\beta_A$ denotes the weight fraction of hydroxyl-functional binder A and $\beta_B$ denotes the weight fraction of hydroxyl-functional binder B, etc. of a car wash-resistant coating composition containing two different hydroxyl functional binders, such that $\beta_A + \beta_B + \ldots = 1$, the OHV value of the car wash-resistant coating composition is then calculated as:

$$OHV = \beta_A \cdot OHV_A + \beta_B \cdot OHV_B +$$

The weight averaged hydroxyl length (OHL) of the hydroxyl-functional acrylic binders is calculated using the mole fractions of all components (monomers and chain extenders).

The chain length $l_i$ between the hydroxyl groups of acrylic monomer i is defined as the number of consecutive carbon and hetero atoms between the oxygen of the hydroxyl group and the first carbon atom in the backbone chain counted via the shortest possible path (e.g. hydroxyethyl methacrylate is counted as 4). The number of chain extending atoms $e_j$ of chain extender j is counted as the number of carbon and hetero atoms in the chain of the chain extender.

TABLE 1

| coating | binder Ex. Nr. | X (kPa/K) | MW | Mn | CL | MF | NCO | TG | OHL | LPF |
|---|---|---|---|---|---|---|---|---|---|---|
| Example 1 | 1 | 98 | 27883 | | | 0.30 | 0 | 263 | 9.2 | 0.41 |
| Example 2 | 2 | 89 | 17117 | | | 0.30 | 0 | 259 | 14.2 | 0.26 |
| Example 3 | 3 | 93 | 19581 | | | 0.30 | 0 | 255 | 9.2 | 0.41 |
| Example 4 | 4 | 102 | 27102 | | | 0.30 | 0 | 261 | 9.2 | 0.23 |

TABLE 1-continued

| | | | | | | | | | | |
|---|---|---|---|---|---|---|---|---|---|---|
| Example 5 | 5 | 110 | 20716 | | | 0.30 | 0 | 249 | 9.2 | 0.31 |
| Example 6 | 6 | 87 | 9171 | | | 0.30 | 0 | 255 | 9.2 | 0.23 |
| Example 7 | 7 | 137 | 16400 | | | 0.30 | 0 | 258 | 9.1 | 0.23 |
| Example 8 | 8 | 145 | 16631 | | | 0.30 | 0 | 258 | 9.1 | 0.27 |
| Example 9 | 9 | 110 | 17531 | | | 0.30 | 0 | 254 | 9.2 | 0.23 |
| Example 10 | 7 | 45 | 16400 | | | 0.00 | 1.98 | 258 | 9.1 | 0.23 |
| Example 11 | 10 | 48 | 8400 | 2283 | 0.202 | 0.30 | 0 | | | |
| Comparative exp 1 | 11 | 48 | 11400 | | | 0.30 | 0 | 292 | 7.7 | 0.09 |
| Comparative exp 2 | 11 | 33 | 11400 | | | 0.00 | 1.67 | 292 | 7.7 | 0.09 |
| Comparative exp 3 | 12 | 41 | 3025 | 1350 | 0.172 | 0.30 | 0 | | | |

| coat | binder Ex. Nr. | E'(40c) (GPa) | ΔTg (C) | X (kPa/k) | Exl (U) | Init. Gloss (GU) | LoG Obs. (%) | LoG | L1 | L2 |
|---|---|---|---|---|---|---|---|---|---|---|
| Example 1 | 1 | 1.83 | 60 | 98 | 0.98 | 90 | 14 | 0.15 | | 0.13 |
| Example 2 | 2 | 1.34 | 57 | 89 | 0.89 | 90 | 13 | 0.13 | | 0.12 |
| Example 3 | 3 | 1.49 | 64 | 93 | 0.93 | 90 | 14 | 0.15 | | 0.14 |
| Example 4 | 4 | 1.88 | 63 | 102 | 0.68 | 90 | 13 | 0.16 | | 0.13 |
| Example 5 | 5 | 1.48 | 64 | 110 | 0.73 | 88 | 14 | 0.14 | | 0.14 |
| Example 6 | 6 | 1.2 | 67 | 87 | 0.58 | 86 | 14 | 0.15 | | 0.15 |
| Example 7 | 7 | 1.98 | 71 | 137 | 0.91 | 91 | 13 | 0.15 | | 0.14 |
| Example 8 | 8 | 2.12 | 68 | 145 | 0.96 | 90 | 12 | 0.14 | | 0.14 |
| Example 9 | 9 | 1.46 | 66 | 110 | 0.73 | 90 | 11 | 0.14 | | 0.14 |
| Example 10 | 7 | 2.14 | 27 | 45 | 0.30 | 86 | 12 | 0.15 | | 0.14 |
| Example 11 | 10 | 1.46 | 44 | 48 | 0.29 | 88 | 12 | 0.16 | 0.16 | |
| Comparative exp 1 | 11 | 2.74 | 38 | 48 | 0.40 | 96 | 23 | 0.20 | | 0.19 |
| Comparative exp 2 | 11 | 2.54 | 22 | 33 | 0.28 | 94 | 23 | 0.182 | | 0.182 |
| Comparative exp 3 | 12 | 2.84 | 22 | 41 | 0.22 | 89 | 28 | 0.26 | 0.26 | |

If more than one acrylic binder is used in the car wash-resistant coating composition, the OHL for the coating composition is calculated based on the OHL values of the different hydroxyl group-containing acrylic binders (i.e. not taking the weight fraction of the cross-linker into account, but including optional chain extenders reacted to the binder), corrected by the weight fractions of the different acrylic binders. If $\beta_A$ denotes the weight fraction of hydroxyl-functional binder A and $\beta_B$ denotes the weight fraction of hydroxyl-functional binder B, etc. of a car wash-resistant coating composition containing two or more different hydroxyl functional binders, such that $\beta_A + \beta_B + \ldots = 1$, the OHL value of the car wash-resistant coating composition is then calculated as:

$$OHL = \beta_A \cdot OHL_A + \beta_B \cdot OHL_B +$$

where $OHL_A$ and $OHL_B$ etc denote the OHL values of the individual binders A and B, etc., respectively. The same procedure applies if more than two binders are used.

The weight-averaged fraction of low-Tg monomers (LPF) in the acrylic binder is determined as follows: The fraction of non-functional low-Tg monomers f is calculated as the weight fraction of low-Tg monomers per hydroxyl-functional binder. If more than one acrylic binder is used for each of these hydroxyl-functional binders, the fraction f is calculated. The weight-averaged fraction of low Tg monomers (LPF) for the car wash-resistant coating composition is then calculated as $LPF = \alpha_1 \cdot f_1 + \alpha_2 \cdot f_2 + \ldots$, where $\alpha_1, \alpha_2$, etc denote the weight fractions on total solids in the car wash-resistant coating composition of binders 1, 2, etc., respectively, and $f_1$ and $f_2$ denote the fraction of low-Tg monomers in binders 1, 2, etc., respectively. It is noted here that total solids includes the at least one binder including optional chain extender and the cross-linker. In this case α is used to indicate the weight fraction.

The Hydroxyl-Functional Binder

The hydroxyl-functional binder may be an acrylic or a polyester binder. Also a mixture of hydroxyl-functional acrylic and/or polyester binders may be used.

Preferably, the binder contains as reactive groups hydroxyl groups part of which are easily available for cross-linking. It is also preferred if at least part of the hydroxyl groups of the binder are primary hydroxyl groups. The hydroxyl-functional binder preferably has a hydroxyl value (OH-value) of more than 50 mg KOH/g and less than 350 mg KOH/g, more preferably of less than 300 mg/g, even more preferably of less than 250 mg/g, and most preferably of less than 200 mg/g. The OHV value is determined as indicated above and expressed in equivalent milligrams of KOH in 1 gram of solid polyol. Preferably, a hydroxyl-functional polyester binder has an OHV value between 50 and 350 mg KOH/g. In case of a hydroxyl-functional acrylic binder the OHV value is preferably between 80 and 250 mg KOH/g.

Hydroxyl-Functional Acrylic Binder

In this patent application the term acrylic binder refers to a binder comprising (meth)acrylic monomers. By (meth)acrylic are meant (meth)acrylate and (meth)acrylic acids well as vinyl esters.

The acrylic binder of the coating composition according to the present invention preferably has a glass transition temperature of between 230K and 350K The acrylic binder of the coating composition according to the present invention preferably comprises at least 20 wt % based on the total weight of the monomers of hydroxyl group-containing monomers selected from the group of primary hydroxyl group-containing monomers or hydroxycycloalkyl group-containing monomers.

The acrylic binder of the coating composition according to the present invention further preferably comprises more than 10 mole % of monomers selected from the group of non-OH-functional low-Tg monomers with a monomer Tg not exceeding 253K for acrylic non-OH-functional monomers, or not exceeding 293K for methacrylic or non-acrylic non-OH-functional monomers.

The acrylic binder further preferably comprises monomers not containing hydroxyl groups and having a Tg higher than 253K for acrylic-type monomers and higher than 293K for methacrylic monomers such as methyl acrylate, tert. butyl acrylate, isobornyl acrylate, isobutyl methacrylate, methyl methacrylate, iso-butyl methacrylate, tert.-butyl methacrylate, cyclohexyl methacrylate, isobornyl methacrylate, acrylic acid and methacrylic acid.

The acrylic binder optionally comprises non-(meth)acrylate monomers such as styrene, vinyl toluene, vinyl esters of branched monocarboxylic acids, maleic acid, fumaric acid, itaconic acid, crotonic acid and monoalkylesters of maleic acid.

Further, in the acrylic binder of the coating composition according to the invention, the average number of atoms between the polymeric backbone of the binder and the oxygen atom of the hydroxyl group (OHL) preferably is at least 6, Preferably, the average number of atoms between the polymeric backbone and the oxygen atom of the hydroxyl group is at least 7, preferably at least 7.5, more preferably at least 8, even more preferably at least 8.5, most preferably at least 9.

Optionally, a minor amount of the acrylic binder may be modified. In a preferred modification, less than 10 wt % of the acrylic monomers is modified by reaction with a polyisocyanate compound, for example isophorone diisocyanate, hexamethylene diisocyanate, 2,4,4-trimethyl hexamethylene diisocyanate, 4,4'-dicyclohexylene diisocyanate methane, 2,4- and 2,6-toluene diisocyanate, and biurets, isocyanurates, uretdiones, allophanates, and iminooxadiazine diones of these isocyanates.

For efficient cross-linking it is advantageous to use a hydroxyl-functional acrylic binder wherein a substantial part of the hydroxyl groups protrude as far as possible from the polymeric backbone. This can be achieved with a binder comprising monomers having pendant (lateral) hydroxyl groups. Suitable acrylic monomers comprising pendant hydroxyl groups are hydroxyalkyl(meth)acrylate monomers, such as hydroxyethyl acrylate, hydroxyethyl methacrylate, hydroxybutyl (meth)acrylate, and hydroxyhexyl (meth) acrylate or hydroxyl-functional cycloalkyl (meth)acrylate monomers such as 4-hydroxycyclo-hexyl(meth)acrylate.

As described above, it is preferred to have a certain number of atoms between the polymeric backbone and the oxygen atom of the hydroxyl group in the acrylic binder. To achieve this, the hydroxyl-functional acrylic binder is reacted with a chain extender. This chain extender comprises a compound reactive with the hydroxyl group of the binder, resulting in a new hydroxyl functionality at a position further from the backbone than before the chain extension. Suitable chain extenders are lactones, such as caprolactone, valerolactone, and butyrolactone, hydroxyl-functional C2-C18 acids such as hydroxypivalinic acid, dimethyl propionic acid, lactic acid, hydroxystearic acid, and the like, and epoxide-functional compounds, such as monoepoxy compounds comprising ethylene oxide, propylene oxide, and glycidyl esters of monocarboxylic acids. Suitable examples include caprolactone, ethylene glycol, propylene glycol. Alternatively, the number of atoms between the backbone and the oxygen atom of the hydroxyl group can be increased by modification of the OH-groups of the OH-functional monomers, followed by (co) polymerisation. The same chain extenders as mentioned above can be applied.

In addition to monomers containing primary hydroxyl groups, the acrylic binder may comprise monomers containing secondary hydroxyl groups such as 2-hydroxypropyl acrylate, 2-hydroxypropyl methacrylate, the reaction product of allylic alcohol and propylene oxide and the reaction product of (meth)acrylic acid and the glycidyl esters of saturated tertiary aliphatic monoacids having 9 to 11 carbon atoms which is available from Resolution Company as Cardura® E.

Optionally, built-in epoxy groups in the acrylic binder may be modified with hydroxyl acids, such as hydroxyl pivalic acid, dimethyl propionic acid, lactic acid, hydroxylstearic acid, and the like, or with diols, or higher alcohols. Again, one can modify epoxy group-containing monomers with hydroxyl acids and/or diols or higher alcohols prior to the (co)polymerisation process.

The degree of protrusion of the hydroxyl groups in the hydroxyl-functional acrylic binder is expressed as the average number of atoms between the polymeric backbone and the oxygen atom of the hydroxyl group. The number of atoms between the oxygen atom of the hydroxyl group and the polymeric backbone needs to be expressed as an average number, as the acrylic binder normally comprises a mixture of different monomers. Especially chain extension leads to different monomers giving a different number of atoms between the polymeric backbone and the oxygen atom of the hydroxyl group.

It should be noted that U.S. Pat. No. 4,546,046 and U.S. Pat. No. 4,082,816 disclose acrylic resins chain extended by the use of a caprolactone compound. However, neither document discloses the use of such binder for a car wash-resistant coating composition wherein the cured coating is characterised by an initial gloss of at least 81 GU and a loss of gloss of less than 0.18. In particular neither discloses the preferred cross-link efficiency $E_{XL}$ of at least 0.3 U or a cross-link density parameter X of at least 50 KPa/K.

An excellent car wash resistance can be achieved with a method in which a coating composition is used wherein the acrylic binder comprises at least 50 wt %, preferably 60 wt %, more preferably 65 wt %, even more preferably at least 75 wt %, and most preferably at least 90 wt % based on the total weight of the monomers of hydroxyl group-containing monomers selected from the group of primary hydroxyl group-containing monomers or (secondary) hydroxylcycloalkyl group-containing monomers.

The hydroxyl-functional acrylic binder comprises a substantial amount of low polar monomers. This amount should at least be 10 wt %, preferably at least 20 wt %, more preferably at least 30 wt % of the total weight of the monomers. Low polar monomers are monomers selected from the group of acrylates, methacrylates and vinyl esters having an oxygen content of less than 25 wt %. Examples of suitable apolar monomers include butyl(meth)acrylate, 2-ethylhexyl(meth) acrylate, lauryl(meth)acrylate, isobutyl(meth)acrylate, nonyl-(meth)acrylate, decyl(meth)acrylate, α-olefins, vinyl esters of α,α-branched monocarboxylic acid (C9-C10) such as VeoVa® 9 and VeoVa® 10 ex Resolution.

As indicated above, the acrylic binder also comprises monomers without a hydroxyl functionality that when homopolymerised would yield a homopolymer with a low glass transition temperature (Tg), i.e. a homopolymer with a glass transition temperature below 293K for methacrylic or non-acrylic monomers or a homopolymer with a glass transition temperature below 253K for acrylic monomers. These monomers will herein be called "non-OH-functional low-Tg monomers".

The glass transition temperature of homopolymers of monomers can be found in handbooks. This Tg and thus low Tg monomers can be found in, e.g., J. Brandrup and E. H. Immergut, (Eds.), *Polymer Handbook,* 3rd Edition, VI, pp. 209-277, John Wiley & Sons (New York: 1989) and D. W. Van Krevelen, *Properties of Polymers,* Elsevier (Amsterdam: 1990) chapter 6.

Further improved car wash resistance properties can be obtained by using an acrylic binder wherein more than 12 mole % of the monomers are selected from the group of non-OH-functional low-Tg monomers with a monomer Tg not exceeding 253K for acrylic non-OH-functional monomers, or not exceeding 293K for methacrylic or non-acrylic (e.g. vinyl esters) non-OH-functional monomers.

Examples of suitable non-OH-functional low-Tg monomers include butyl acrylate, isobutyl acrylate, pentyl(meth)acrylate, hexyl(meth)acrylate, octyl-(meth)acrylate, 2-ethylhexyl(meth)acrylate, nonyl(meth)acrylate, decyl(meth)acrylate, lauryl(meth)acrylate, α-olefins.

The acrylic binder preferably has a theoretical Tg of at least 230K, more preferably at least 240K, most preferably at least 250K.

Hydroxyl-Functional Polyester Binder

The hydroxyl-functional binder component may also comprise a hydroxyl-functional polyester binder. It is preferred that the majority of the hydroxyl groups of such polyester polyol are primary hydroxyl groups. More preferred are polyester polyols having hydroxyl groups which are separated from an adjacent ester group by an alkylene group having at least 3 carbon atoms in a linear sequence.

These preferred polyester polyols can be formed by the polyesterification of at least one polycarboxylic acid with a stochiometric excess of at least one polyalcohol, where the hydroxyl groups are separated by at least three consecutive linearly arranged carbon atoms.

A method to form particularly preferred polyester polyols comprises chain extending the hydroxyl-functional polyester polyol by reaction of the hydroxyl groups of a precondensed polyester polyol with chain extenders, preferably lactones such as caprolactone, valerolactone, and butyrolactone, such as described above for the hydroxyl-functional acrylic binder.

Optionally, the polyester polyol may comprise cocondensed monofunctional carboxylic acids, monofunctional alcohols, hydroxy acids and/or monofunctional epoxy compounds.

Suitable polycarboxylic acids include phthalic anhydride, hexahydrophthalic anhydride, isophthalic acid, 1,4-cyclohexane dicarboxylic acid, adipic acid, azelaic acid, sebacic acid, dimer acid, and mixtures thereof.

Examples of suitable polyalcohols include triols such as trimethylol propane and trimethylol ethane, diols such as 1,3-propane diol, 1,4-butane diol, 2-methyl-1,3-propane diol, 2,2-dimethyl-1,3-propane diol, 2-butyl-2-ethyl-1,3-propane diol, 1,6hexane diol, 1,4-cyclohexane dimethanol, dimer diol, and mixtures of these polyalcohols.

The optionally co-condensed monocarboxylic acid may be aliphatic, cycloaliphatic, aromatic or mixtures thereof. Preferably, the monocarboxylic acid contains 6 to 18 carbon atoms, most preferably 7 to 14 carbon atoms, such as octanoic acid, 2-ethylhexanoic acid, isononanoic acid, decanoic acid, dodecanoic acid, benzoic acid, hexahydrobenzoic acid, and mixtures thereof.

Typical hydroxy acids that can be used include dimethylol propionic acid, hydroxypivalic acid, and hydroxystearic acid.

Examples of suitable monofunctional alcohols include alcohols with 6-18 carbon atoms such as 2-ethyl hexanol, dodecanol, cyclohexanol and trimethyl cyclohexanol.

Suitable monofunctional epoxy compounds include the glycidyl esters of branched monocarboxylic acids such as Cardura® E from Resolution. Particularly in polyesters it is preferred that Cardura® E is not used in an amount of more than 25 wt % on total polyester binder weight, preferably not more than 22.5 wt %, more preferably not more than 20 wt %, even more preferably not more than 17.5 wt %, most preferably not more than 15 wt %

The Cross-Linker

The cross-linker can be any usual cross-linker that comprises functional groups reactive with the hydroxyl groups of the hydroxyl-functional binder. It may be a cross-linker reacting with the binder to form an ether or ester bond or a cross-linker comprising free or blocked isocyanate groups. Preferably, the at least one cross-linker is an amino-functional cross-linker or a (blocked) isocyanate-functional cross-linker Amino-Functional Cross-Linker Cross-linkers which react with the hydroxyl groups of the binder to form ether structures comprise amino resins. Amino resins are well known to the skilled artisan and are offered as commercial products by many companies. They comprise condensates of aldehydes, especially formaldehyde, with, for example, urea, melamine, guanamine, and benzoguanamine. The amino resins containing alcohol groups, preferably methylol groups, in general are partially or, preferably, fully etherified with alcohols. Use is made in particular of melamine-formaldehyde resins etherified with lower alcohols, especially with methanol or butanol. Particular preference is given to the use as cross-linkers of melamine-formaldehyde resins which are etherifed with lower alcohols, especially with methanol and/or ethanol and/or butanol, and which still contain on average from 0.1 to 0.25 hydrogen atoms attached to nitrogen atoms per triazine ring.

The triazine-based cross-linkers which react with the hydroxyl groups of the binder to form ether groups comprise transesterification cross-linkers, such as tris(alkoxycarbonylamino)triazine or the like, as also described, for example, in EP-A-604 922, the disclosure of which publication p. 6, II. 1-23 and p. 6, I. 46-p. 7, I. 3 is incorporated herein by reference. As it is believed that the elastic scratch recovery may be negatively influenced by the triazine compounds, it is preferred, especially in those cases where according to the formula (I) is required to have a low E' to achieve a low loss of gloss, that the coating composition comprises a low carbamoyl triazine content, in particular comprising less than 2.0 wt %, preferably less than 1.5 wt %, more preferably less than 1.2 wt %, even more preferably less than 1.0 wt %, and most preferably less than 0.8 wt % carbamoyl triazine on the total composition.

In preferred embodiments the cross-linker comprises a functionalised melamine compound and/or an isocyanate-functional compound.

(Blocked) Isocyanate-Functional Cross-Linker

Preferably, the coating composition of the invention comprises isocyanate-functional cross-linkers. These comprise the usual isocyanate-functional compounds known to a person skilled in the art. More preferably, the coating composition comprises cross-linkers with at least two (free) isocyanate groups. Examples of compounds comprising at least two isocyanate groups are aliphatic, alicyclic, and aromatic isocyanates such as hexamethylene diisocyanate, 2,4,4-trimethyl hexamethylene diisocyanate, dimeric acid diisocyanate, such as DDI® 1410 ex Henkel, 1,2-cyclohexylene diisocyanate, 1,4-cyclohexylene diisocyanate, 4,4'-dicyclohexylene diisocyanate methane, 3,3'-dimethyl-4,4'-dicyclohexylene diisocyanate methane, norbornane diisocyanate, m- and p-phenylene diisocyanate, 1,3- and 1,4-bis(isocyanate methyl) benzene, 1,5-dimethyl-2,4-bis(isocyanate methyl) benzene, 2,4- and 2,6-toluene diisocyanate, 2,4,6-toluene triisocyanate, α,α,α',α'-tetramethyl o-, m-, and p-xylylene diisocyanate, 4,4'-diphenylene diisocyanate methane, 4,4'-diphenylene diisocyanate, naphthalene-1,5-diisocyanate, isophorone diisocyanate, 4-isocyanatomethyl-1,8-octamethylene diisocyanate, and mixtures of the aforementioned polyisocyanates.

Other preferred isocyanate compounds are the adducts of polyisocyanates, e.g., biurets, isocyanurates, imino-oxadiazinediones, allophanates, uretdiones, and mixtures thereof.

Examples of such adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the adduct of 1 molecule of pentaerythritol to 4 molecules of toluene diisocyanate, the isocyanurate of hexamethylene diisocyanate, available from Bayer under the trade designation Desmodur® N3390, a mixture of the uretdione and the isocyanurate of hexamethylene diisocyanate, available from Bayer under the trade designation Desmodur® N3400, the allophanate of hexamethylene diisocyanate, available from Bayer under the trade designation Desmodur® LS 2101, and the isocyanurate of isophorone diisocyanate, available from Hüls under the trade designation Vestanat® T1890. Furthermore, (co)polymers of isocyanate-functional monomers such as α,α'-dimethyl-m-isopropenyl benzyl isocyanate are suitable for use. Finally, as is known to the skilled person, the above-mentioned isocyanates and adducts thereof may be at least partly present in the form of blocked isocyanates.

For blocking the polyisocyanates it is possible in principle to employ any blocking agent which can be employed for the blocking of polyisocyanates and has a sufficiently low deblocking temperature. Blocking agents of this kind are well known to the skilled worker and need not be elucidated further here. It is possible to employ a mixture of blocked polyisocyanates which contains both isocyanate groups blocked with a first blocking agent and isocyanate groups blocked with a second blocking agent. Reference is made to WO 98/40442.

The coating compositions according to the invention may be one-component or two-component compositions. In one-component compositions all binder components and cross-linker components are mixed in one package and react to form cross-links at relatively high temperatures, in general above 100° C., usually in the presence of a catalyst. In two-component compositions the binder and cross-linker components are stored separately to avoid premature reaction. Mixing both packages is done immediately before application of the coating composition. Cross-linkers containing free isocyanates are normally used in two-component compositions. Amino resins and blocked isocyanates are examples of cross-linkers which are with normally used in one-component coating compositions.

For two-component compositions the two components are usually sold together as a kit of parts each part containing one component. Therefore, another embodiment of the invention relates to a kit of parts for the manufacture of a car wash-resistant coating, comprising a first part comprising at least one cross-linker and a second part comprising at least one hydroxyl-functional binder, wherein the at least one cross-linker is a cross-linker according to any one of the embodiments described above and the at least one hydroxyl-functional binder is a hydroxyl-functional binder according to any one of the embodiments described above and wherein the coating composition is characterised in that after curing the coating has i) an initial gloss of at least 81 GU and a loss of gloss (LoG) of less than 0.18, the loss of gloss being determined by the formula (I):

$$LoG = A + B \cdot E' \cdot (X)^{-1} \cdot 10^{(C \cdot \Delta Tg)} + D \cdot (E')^{-0.5} \quad (I)$$

wherein A=0.0132, B=1.0197, C=0.0113, and D=0.0566, E' reflects the tensile storage modulus at 40° C. in GPa, ΔTg the width of the glass transition temperature in ° C., and X the cross-link density parameter in kPa/K, all three parameters determined in a DMTA test at 11 Hz and a heating rate of 5° C./min.

The glass transition temperature of the cured coating compositions according to the invention is between 30° C. and 170° C., preferably between 40° C. and 160° C., more preferably between 50° C. and 150° C., even more preferably between 60° C. and 140° C., and most preferably between 70° C. and 130° C.

The coating composition according to the invention may comprise one or more co-binders. The co-binder can be selected from the group of acrylic binders, polyester polyols, polyether polyols, polyester polyurethane polyols, polycarbonate polyols. In two component systems the co-binder can also be a ketimine, oxazolidine, blocked amine or bicyclic orthoester binder.

In a preferred embodiment the coating composition comprises at least 50 wt % of hydroxyl-functional acrylic binders, based on the total amount of binder present, more preferably at least 60 wt %, even more preferably at least 70 wt %, and most preferably at least 80 wt %

The coating compositions of the invention normally comprise (co)binders and cross-linkers in amounts such that the binder or (co)binders is/are present in an amount of from 40 to 90, preferably from 50 to 75 wt %, and the cross-linker or cross-linkers is/are present in an amount of from 10 to 60, preferably from 25 to 50 wt %, the weight percentages being based on binder+cross-linker=100 wt %.

The coating composition can contain the conventional additives and adjuvants, such as dispersing agents, dyes, accelerators for the curing reaction, pigments, and rheology modifiers. The coating composition may also comprise sag control agents like SCA available from AkzoNobel.

The coating composition can be in a dry powder form or in liquid form. The coating composition according to the invention preferably is a liquid. The coating composition can be solvent based or water based. Preferably, the coating composition is solvent based. The coating composition preferably comprises less than 780 g/l of volatile organic solvent based on the total composition, more preferably less than 420 g/l, most preferably less than 250 g/l.

The coating composition according to the present invention is preferably used as a clear coat in a so-called base coat/clear coat system or as a pigment-free top coat. Use of the coating compositions according to the invention as a clear coat or top coat may prevent the clear coat or top coat suffering car wash-induced optical defects, such as a loss of gloss and loss of DOI (distinctness of image). The base coat used in the base coat/clear coat system can for instance be a one-component or a two-component system. The base coat can be physically drying or chemically drying. The base coat can be water borne or solvent borne.

The coating composition according to the invention can be applied to a substrate in any desirable manner, such as by roller coating, spraying, brushing, sprinkling, flow coating, dipping, electrostatic spraying, or electrophoresis, preferably by spraying, most preferably by electrostatic spraying.

Suitable substrates can be of metal, synthetic material (plastics), optionally pretreated, e.g., with a primer, a filler, or as indicated above for a clear coat, with a base coat. Curing may be carried out at ambient temperature or, optionally, at elevated temperature to reduce the curing time. Preferably, the coating composition may be baked at higher temperatures in the range of, for instance, 60 to 160° C., in a baking oven over a period of 10 to 60 minutes. Curing can also be induced by actinic light radiation, such as UV light, IR light, NIR light, when mixed with suitable reactive compounds and additives known to the person skilled in the art. The clear coat can be applied on the base coat wet-on-wet. Optionally, the base coat may be partially cured prior to the application of the clear coat. Also, the base coat may be fully cured prior to the application of the clear coat.

The compositions of the present invention are particularly suitable in the first finishing of automobiles and motorcycles. The compositions can also be used in the preparation of coated metal substrates, such as in the refinish industry, in particular the body shop, to repair automobiles and transportation vehicles, and in finishing large transportation vehicles such as trains, trucks, buses, and aeroplanes.

The invention will be further described in the following examples, which must not be construed as limiting the scope of the present invention.

Specification of Terms:
Byk® 331: flow additive ex Byk-Chemie
Nacure® 5225: blocked acid catalyst ex King Industries
Setamine® US 138 BB-70: butylated melamine resin ex Akzo Nobel
Solvesso® 100: a blend of aromatic hydrocarbon solvents ex ExxonMobile Chemical
Solvesso® 150: a blend of aromatic hydrocarbon solvents ex ExxonMobile Chemical
Tinuvin® CGL 052: hindered amine light stabiliser ex Ciba Specialty Chemicals
Tinuvin® 292: hindered amine light stabiliser ex Ciba Specialty Chemicals
Tinuvin® 384: UV light stabiliser ex Ciba Specialty Chemicals
Trigonox® 42S: tert-butyl peroxy-3,5,5-trimethyl hexanoate ex Akzo Nobel
Trigonox® B: di-tert-butyl peroxide ex Akzo Nobel
Baysilon® OL-17: Silicone oil ex Bayer AG
BYK® 306: Flow additive ex Byk-Chemie
Tinuvin® 1130: UV light stabilizer ex Ciba Specialty Chemicals
Tinuvin® 292: Hindered amine light stabilizer ex Ciba Specialty Chemicals
Desmodur® N 3390: Polyisocyanate hardener ex Bayer AG
Dowanol® PM acetate: Methoxypropyl acetate solvent ex Dow Chemicals Binder Sample 1

A reaction vessel equipped with a stirrer, a thermocouple, a condenser, a nitrogen inlet, and an addition funnel was charged with 358.8 g Solvesso® 100 solvent and 0.24 g dibutyl tin oxide and heated to reflux. A mixture of 303.0 g ethyl acrylate, 186.4 g butyl acrylate, 251.5 g 2-hydroxyethyl acrylate, 24.7 g methacrylic acid, 250.8 g styrene, 183.6 g ε-caprolactone, and 21.0 g Trigonox® 42S was gradually added during 3 hours. After the addition the addition funnel was rinsed with 34.2 g of Solvesso® 100. The mixture was cooled to 140° C. and a mixture of 3.0 g of Solvesso® 100 and 3.0 g of Trigonox® B was added during 30 minutes. The reaction mixture was kept at 140° C. for one hour and finally cooled and diluted with Solvesso® 100 to a solids content of 70%. The resultant product had a weight average molecular weight of 27,883, a polydispersity of 4.69, and a calculated hydroxyl number of 100 on solid resin.

Binder Sample 2

A reaction vessel equipped with a stirrer, a thermocouple, a condenser, a nitrogen inlet, and an addition funnel was charged with 358.8 g Solvesso® 100 solvent and 0.24 g dibutyl tin oxide and heated to reflux. A mixture of 191.3 g ethyl acrylate, 251.5 g 2-hydroxyethyl acrylate, 23.4 g methacrylic acid, 250.8 g styrene, 123.6 g lauryl methacrylate, 359.4 g ε-caprolactone, and 21.0 g Trigonox® 42S was gradually added during 3 hours. After the addition the addition funnel was rinsed with 34.2 g of Solvesso® 100. The mixture was cooled to 140° C. and a mixture of 3.0 g of Solvesso® 100 and 3.0 g of Trigonox® B was added during 30 minutes. The reaction mixture was kept at 140° C. for one hour and finally cooled and diluted with Solvesso® 100 to a solids content of 70%. The resultant product had a weight average molecular weight of 17,117, a polydispersity of 3.46, and a calculated hydroxyl number of 100 on solid resin.

Binder Sample 3

A reaction vessel equipped with a stirrer, a thermocouple, a condenser, a nitrogen inlet, and an addition funnel was charged with 358.8 g Solvesso® 100 solvent and 0.24 g dibutyl tin oxide and heated to reflux. A mixture of 220.6 g ethyl acrylate, 251.5 g 2-hydroxyethyl acrylate, 24.7 g methacrylic acid, 250.8 g styrene, 268.8 g 2-ethylhexyl acrylate, 183.6 g ε-caprolactone, and 21.0 g Trigonox® 42S was gradually added during 3 hours. After the addition the addition funnel was rinsed with 34.2 g of Solvesso® 100. The mixture was cooled to 140° C. and a mixture of 3.0 g of Solvesso® 100 and 3.0 g of Trigonox® B was added during 30 minutes. The reaction mixture was kept at 140° C. for one hour and finally cooled and diluted with Solvesso® 100 to a solids content of 70%. The resultant product had a weight average molecular weight of 19,581, a polydispersity of 3.87, and a calculated hydroxyl number of 100 on solid resin.

Binder Sample 4

A reaction vessel equipped with a stirrer, a thermocouple, a condenser, a nitrogen inlet, and an addition funnel was charged with 358.8 g Solvesso® 100 solvent and 0.24 g dibutyl tin oxide and heated to reflux. A mixture of 139.2 g ethyl acrylate, 377.4 g 2-hydroxyethyl acrylate, 22.8 g methacrylic acid, 250.8 g styrene, 134.4 g 2ethylhexyl acrylate, 359.4 g ε-caprolactone, and 21.0 g Trigonox® 42S was gradually added during 3 hours. After the addition the addition funnel was rinsed with 34.2 g of Solvesso® 100. The mixture was cooled to 140° C. and a mixture of 3.0 g of Solvesso® 100 and 3.0 g of Trigonox® B was added during 30 minutes. The reaction mixture was kept at 140° C. for one hour and finally cooled and diluted with Solvesso® 100 to a solids content of 70%. The resultant product had a weight average molecular weight of 27,102, a polydispersity of 4.87, and a calculated hydroxyl number of 150 on solid resin.

Binder Sample 5

A reaction vessel equipped with a stirrer, a thermocouple, a condenser, a nitrogen inlet, and an addition funnel was charged with 358.8 g Solvesso® 100 solvent and 0.24 g dibutyl tin oxide and heated to reflux. A mixture of 372.0 g n-butyl acrylate, 377.4 g 2-hydroxyethyl acrylate, 22.8 g methacrylic acid, 152.4 g styrene, 275.4 g ε-caprolactone, and 21.0 g Trigonox® 42S was gradually added during 3 hours. After the addition the addition funnel was rinsed with 34.2 g of Solvesso® 100. The mixture was cooled to 140° C. and a mixture of 3.0 g of Solvesso® 100 and 3.0 g of Trigonox® B was added during 30 minutes. The reaction mixture was kept at 140° C. for one hour and finally cooled and diluted with Solvesso® 100 to a solids content of 70%. The resultant product had a weight average molecular weight of 20,716, a polydispersity of 4.58, and a calculated hydroxyl number of 150 on solid resin.

Binder Sample 6

A reaction vessel equipped with a stirrer, a thermocouple, a condenser, a nitrogen inlet, and an addition funnel was charged with 358.8 g Solvesso® 100 solvent, and 0.24 g dibutyl tin oxide and heated to reflux. A mixture of 1.7 g ethyl acrylate, 377.4 g 2-hydroxyethyl acrylate, 22.8 g methacrylic acid, 253.9 g methyl methacrylate, 268.8 g 2-ethylhexyl acrylate, 275.4 g ε-caprolactone, and 21.0 g Trigonox® 42S was gradually added during 3 hours. After the addition the addition funnel was rinsed with 34.2 g of Solvesso® 100. The mixture was cooled to 140° C. and a mixture of 3.0 g of Solvesso® 100 and 3.0 g of Trigonox® B was added during 30 minutes. The reaction mixture was kept at 140° C. for one hour and finally cooled and diluted with Solvesso® 100 to a solids content of 70%. The resultant product had a weight average molecular weight of 9,171, a polydispersity of 2.81, and a calculated hydroxyl number of 150 on solid resin.

Binder Sample 7

A reaction vessel equipped with a stirrer, a thermocouple, a condenser, a nitrogen inlet, and an addition funnel was charged with 387.1 g Solvesso® 100 solvent and 0.26 g dibutyl tin oxide and heated to reflux. A mixture of 410.5 g 2-hydroxyethyl acrylate, 24.9 g methacrylic acid, 273.0 g styrene, 217.1 g 2-ethylhexyl acrylate, 79.2 g 2-ethylhexyl methacrylate, 295.5 g ε-caprolactone, and 27.8 g Trigonox® 42S was gradually added during 3 hours. After the addition the addition funnel was rinsed with 37.0 g of Solvesso® 100. The mixture was cooled to 140° C. and a mixture of 3.3 g of Solvesso® 100 and 3.3 g of Trigonox® B was added during 30 minutes. Finally the mixture was cooled and diluted with Solvesso® 100 to a solids content of 70%. The resultant product had a weight average molecular weight of 17,550, a polydispersity of 3.67, and a calculated hydroxyl number of 150 on solid resin.

Binder Sample 8

A reaction vessel equipped with a stirrer, a thermocouple, a condenser, a nitrogen inlet, and an addition funnel was charged with 364.2 g Solvesso® 100 solvent and 0,2 g dibutyl tin oxide and heated to 165° C. A mixture of 78.9 g 2-hydroxyethyl acrylate, 24.85 g methacrylic acid, 255.8 g styrene, 125.7 g 2-ethylhexyl acrylate, 377.4 g 4-hydroxybutyl acrylate, 200.9 g 2-ethylhexyl methacrylate, 154.9 g ε-caprolactone, and 21.3 g Trigonox® 42S was gradually added during 3 hours. After the addition the addition funnel was rinsed with 32.6 g of Solvesso® 100. The mixture was cooled to 140° C. and a mixture of 3.0 g of Solvesso® 100 and 3.0 g of Trigonox® B was added during 30 minutes. Finally the mixture was cooled and diluted with Solvesso® 100 to a solids content of 70%. The resultant product had a weight average molecular weight of 16,631, a polydispersity of 3.93, and a calculated hydroxyl number of 150 on solid resin.

Binder Sample 9

A reaction vessel equipped with a stirrer, a thermocouple, a condenser, a nitrogen inlet, and an addition funnel was charged with 358.8 g Solvesso® 100 solvent and 0.24 g dibutyl tin oxide and heated to 165° C. A mixture of 4.8 g ethyl acrylate, 377.4 g 2-hydroxyethyl acrylate, 22.8 g methacrylic acid, 250.8 g styrene, 268.8 g 2-ethylhexyl acrylate, 275.4 g ε-caprolactone, and 21.0 g Trigonox®42S was gradually added during 3 hours. After the addition the addition funnel was rinsed with 34.2 g of Solvesso® 100. The mixture was cooled to 140° C. and a mixture of 3.0 g of Solvesso® 100 and 3.0 g of Trigonox® B was added during 30 minutes. Finally the mixture was cooled and diluted with Solvesso® 100 to a solid content of 70%. The resultant product had a weight average molecular weight of 16,300, a polydispersity of 3.96, and a calculated hydroxyl number of 150 on solid resin.

Binder Sample 10

Into a 5-liter reactor equipped with a stirrer, a thermocouple, a packed column, a condensor, a nitrogen inlet, a water separator, and a heating mantle were charged 280 g of isononaoic acid, 933.9 g of trimethylol propane, 316.4 g of 2-butyl-2-ethyl-1,3-propane diol, 1200 g of 1,4-cyclohexane dicarboxylic acid, and 3.50 g of triphenyl phosphite. The reactor was heated slowly under nitrogen to 80-100° C. to melt the charged ingredients. Then, with stirring and under a nitrogen atmosphere, the contents were heated to a temperature of 230° C. Reaction water was distilled off at a rate such that the temperature at the top of the packed column did not exceed 102° C. The reaction was continued at 230° C. until the acid value of the formed polyester resin reached a value of 11.2 mg KOH/g on solid resin. Next, the reaction mixture was cooled to 175° C. and 770 g of ε- caprolactone and 0.70 g of dibutyl tin dilaurate were added. The reaction mixture was maintained at 175° C. for a period of 3 hours and then cooled to 120° C. After the addition of 400 g of butyl acetate and 400 g of propylene glycol monomethylether acetate a polyester polyol solution having a solids content of 80%, a viscosity of 5.2 Pa·s at 20° C., a calculated hydroxyl number of 170 on solid resin, and a weight average molecular weight of 8,400 was obtained.

Binder Sample 11

A reaction vessel equipped with a stirrer, a thermocouple, a condenser, a nitrogen inlet, and an addition funnel was charged with 966 g of Solvesso® 100, 28.5 g 1-butanol, and 0.35 g of dibutyl tin oxide and heated to reflux. A mixture of 502.5 g of 2-hydroxyethyl acrylate, 61.0 g of methacrylic acid, 1,012.5 g of styrene, 190.0 g of lauryl methacrylate, 258.5 g of ε-caprolactone, 84.0 g of Trigonox® 42S, 56,6 g of Solvesso® 100 was added gradually during 4 hours. The addition funnel was rinsed with 50.0 g of Solvesso® 100. After 30 minutes the mixture was cooled to 150° C. and a mixture of 5.0 g of Trigonox® 42S and 5.0 g of Solvesso® 100 was added. The mixture was kept at 150° C. for one hour. Finally the mixture was cooled and diluted with Solvesso® 100 to a solid content of 64%. The resultant product had a weight average molecular weight of 11,400, a polydispersity of 3.3, and a calculated hydroxyl number of 118 on solid resin.

Binder Sample 12

Into a 2-liter reactor equipped with a stirrer, a thermocouple, a packed column, a condenser, a nitrogen inlet, a water separator, and a heating mantle were charged 262.5 g of 1,6-hexane diol, 394.4 g of trimethylol propane, 243.9 g of 2-butyl-2-ethyl-1,3-propane diol, 849.2 g of hexahydrophthalic anhydride, and 1.75 g of triphenyl phosphite. The reactor was heated slowly under nitrogen to 80-100° C. to melt the charged ingredients. Then, with stirring and under a nitrogen atmosphere, the contents were heated to a temperature of 230° C. Reaction water was distilled off at a rate such that the temperature at the top of the packed column did not exceed 102° C. The reaction was continued at 230° C. until the acid value of the formed polyester resin reached a value of 14 mg KOH/g on solid resin. Then the temperature was raised to 240° C. and the condensation was continued at this temperature until an acid number of 12.5 was reached. The reaction mixture then was cooled to 120° C. and 196 g of butyl acetate and 196 g of propylene glycol monomethyl ether acetate were added to form a polyester polyol solution having a solids content of 78.5%, a viscosity of 8.0 Pa·s at 20° C., a calculated hydroxyl value of 190 on solid resin, and a weight average molecular weight of 3,025.

COATING COMPOSITION EXAMPLE 1

100 g of the solution of Binder sample 1 were added to a mixture of 42,9 g Setamine® US 138 BB-70, 1.6 g Tinuvin® CGL 052, 1.0 g Tinuvin 384, 0.15 g Byk® 331, 27.0 g Solvesso 150, 6.0 g xylene, 2.5 g butyl diglycol, and 1.0 g Nacure® 5225. The resulting coating composition was diluted to spray viscosity (28 seconds Afnor 4 cup) with Solvesso® 100.

COATING COMPOSITION EXAMPLES 2 to 9

Similar to Coating composition example 1 but instead of the resin solution of Binder sample 1 the resin solutions of each of Binder samples 2 to 9 were used.

COATING COMPOSITION EXAMPLE 10

To 140.8 g of the resin solution of Binder sample 7 a mixture of 4.5 g of Baysilon® OL-17, 0.8 g BYK-306, 2.2 g Tinuvin® 1130, 1.5 g Tinuvin® 292, and 6.0 g Solvesso® 100 was added. Just before application of the coating composition a mixture of 57.3 g Desmodur® N 3390 and 12.8 g of Dowanol® PM acetate was added. The resulting coating composition was diluted to spray viscosity (28 seconds Afnor 4 cup) with a 1:1 mixture of Solvesso® 100 and Dowanol® PM acetate.

COATING COMPOSITION EXAMPLE 11

To 88.4 g of the resin solution of Binder sample 10 were added 42.9 g Setamine® US 138-BB-70, 1.6 g Tinuvin® CGL 052, 1.0 g Tinuvin 384, 0.15 g Byk® 331, 27.0 g Solvesso® 150, 6.0 g xylene, 2.5 g butyl diglycol, and 1.0 g Nacure® 5225. The resulting coating composition was diluted to spray viscosity (28 seconds Afnor 4 cup) with Solvesso® 100.

Comparative Coating Composition Experiment 1

94.6 g of the resin solution of Binder sample 11 were added to a mixture of 42.9 g Setamine® US 138 BB-70, 1.0 g Tinuvin® 292, 1.0 g Tinuvin 384, 0.15 g Byk® 331, 5.0 g butyl glycol acetate. The resulting mixture was diluted to spray viscosity (28 seconds Afnor 4 cup) with Solvesso® 100.

Comparative Coating Composition Experiment 2

To 156.3 g of the resin solution of Binder sample 11 a mixture of 4.5 g of Baysilon OL-17, 0.8 g BYK-306, 2.2 g Tinuvin 1130, 1.5 g Tinuvin® 292, 1.5 g Tinstab BL 277, and 6.0 g Solvesso® 100 was added. Just before application of the coating composition a mixture of 45.1 g Desmodur N 3390 and 12.8 g of Dowanol PM acetate was added. The resulting coating composition was diluted to spray viscosity (28 seconds Afnor 4 cup) with a 1:1 mixture of Solvesso® 100 and Dowanol PM acetate.

Comparative Coating Composition Experiment 3

89.2 g of the resin solution of Binder sample 12 were added to a mixture of 42.9 g Setamine® US 138 BB-70, 1.6 g Tinuvin® CGL 052, 1.0 g Tinuvin 384, 0.15 g Byk® 331, 27.0 g Solvesso® 150, 6.0 g xylene, 2.5 g butyl diglycol, and 1.0 g Nacure® 5225. The resulting coating composition was diluted to spray viscosity (28 seconds Afnor 4 cup) with a 1:1:1 mixture of butyl acetate, Dowanol PM acetate, and n-butanol.

Coating compositions were spray applied to electrocoated steel panels coated with a commercial primer and a commercial dark blue base coat. The base coat was applied in two layers with a 1 minute flash-off between the layers. The coating composition was applied after 5 minutes flash-off, also in two layers. After 10 minutes flash-off the complete system was baked for 24 minutes at 140° C.

The car wash resistance was determined with the aid of a mini-car wash device according to Renault specification RNUR 2204—C.R. PO N° 2204. In this test the coated panel is subjected for 10 minutes to a rotating washing brush similar to the ones used in a commercial car wash. During this operation a slurry of aluminium oxide paste Durmax 24H from Prolabo Paris is continuously sprayed over the panel. The loss of gloss is taken as a measure of the car wash resistance. The Observed Loss of Gloss is defined as follows: Observed Loss of Gloss=(initial gloss−final gloss)/initial gloss * 100%. The Initial gloss is defined as the gloss of the cured coating before the car wash test. The Final gloss is defined as the gloss of the cured coating after the car wash test. Gloss was measured in accordance with ISO 2813 using a Haze Gloss apparatus from Byk Gardner GmbH. The time elapsed between the car wash test and the loss of gloss measurement was about 1-3 hours. All samples were stored at room temperature between the car wash test and the gloss measurement.

For DTMA measurements a free standing coating film was prepared by applying the coating composition on polypropylene panels in a wet layer thickness of 100 microns using a doctor blade. After a 10-minute flash-off period the panels were baked for 24 minutes at 140° C. The cured coating can readily be peeled off the polypropylene panel to produce a free standing film of coating. From the free standing film a sample was cut for DMTA measurements of 3 mm width and at least 30 mm length. The length between the clamps of the tensile bench of the DMTA was 30 mm. A DMTA measurement was performed at 11 Hz and a heating rate of 5° C./min, from which the tensile storage modulus E' at 40° C. (in GPa), the width of the glass transition temperature $\Delta Tg$ (in ° C.), and the cross-link density parameter X (in kPa/K) were evaluated as described above. The loss of gloss (LoG) was calculated using the formula (I). Further, the various coating composition parameters were determined, in particular Mw, Mn, the MF, the NCO, the TG, the OHL and the LPF, and the Exi were, where appropriate, determined as described above. All results are summarised in Table 1.

It is clearly demonstrated that the coating compositions based on the coating compositions of Examples 1-11 have a lower observed loss of gloss and hence an improved car wash resistance compared to the coating compositions of Comparative experiments 1, 2, and 3. The calculated loss of gloss LoG according to formula (I) accurately predicts the observed loss of gloss values.

Also the L1 and the L2 values according to formula (II) and (III) accurately predict those compositions leading to a low observed loss of gloss.

TABLE 1

| coating | binder Ex. Nr | X (kPa/K) | MW | Mn | CL | MF | NCO | TG | OHL | LPF |
|---|---|---|---|---|---|---|---|---|---|---|
| Example 1 | 1 | 98 | 27883 | | | 0.30 | 0 | 263 | 9.2 | 0.41 |
| Example 2 | 2 | 89 | 17117 | | | 0.30 | 0 | 259 | 14.2 | 0.26 |
| Example 3 | 3 | 93 | 19581 | | | 0.30 | 0 | 255 | 9.2 | 0.41 |
| Example 4 | 4 | 102 | 27102 | | | 0.30 | 0 | 261 | 9.2 | 0.23 |
| Example 5 | 5 | 110 | 20716 | | | 0.30 | 0 | 249 | 9.2 | 0.31 |
| Example 6 | 6 | 87 | 9171 | | | 0.30 | 0 | 255 | 9.2 | 0.23 |
| Example 7 | 7 | 137 | 16400 | | | 0.30 | 0 | 258 | 9.1 | 0.23 |
| Example 8 | 8 | 145 | 16631 | | | 0.30 | 0 | 258 | 9.1 | 0.27 |
| Example 9 | 9 | 110 | 17531 | | | 0.30 | 0 | 254 | 9.2 | 0.23 |
| Example 10 | 7 | 45 | 16400 | | | 0.00 | 0.36 | 258 | 9.1 | 0.23 |
| Example 11 | 10 | 48 | 8400 | 2283 | 0.202 | 0.30 | 0 | | | |
| Comparative exp 1 | 11 | 48 | 11400 | | | 0.30 | 0 | 292 | 7.7 | 0.09 |
| Comparative exp 2 | 11 | 33 | 11400 | | | 0.30 | 0.41 | 292 | 7.7 | 0.09 |
| Comparative exp 3 | 12 | 41 | 3025 | 1350 | 0.172 | 0.30 | 0 | | | |

| coat | binder Ex. Nr | E'(40 C.) (GPa) | ΔTg (C.) | X (kPa/K) | Exi (U) | Init. Gloss (GU) | LoG Obs.(%) | LoG | L1 | L2 |
|---|---|---|---|---|---|---|---|---|---|---|
| Example 1 | 1 | 1.83 | 60 | 98 | 0.98 | 90 | 14 | 0.15 | | 0.13 |
| Example 2 | 2 | 1.34 | 57 | 89 | 0.89 | 90 | 13 | 0.13 | | 0.12 |
| Example 3 | 3 | 1.49 | 64 | 93 | 0.93 | 90 | 14 | 0.15 | | 0.14 |
| Example 4 | 4 | 1.88 | 63 | 102 | 0.68 | 90 | 13 | 0.16 | | 0.13 |
| Example 5 | 5 | 1.48 | 64 | 110 | 0.73 | 88 | 14 | 0.14 | | 0.14 |
| Example 6 | 6 | 1.2 | 67 | 87 | 0.58 | 86 | 14 | 0.15 | | 0.15 |
| Example 7 | 7 | 1.98 | 71 | 137 | 0.91 | 91 | 13 | 0.15 | | 0.14 |
| Example 8 | 8 | 2.12 | 68 | 145 | 0.96 | 90 | 12 | 0.14 | | 0.14 |
| Example 9 | 9 | 1.46 | 66 | 110 | 0.73 | 90 | 11 | 0.14 | | 0.14 |
| Example 10 | 7 | 2.14 | 27 | 45 | 0.30 | 86 | 12 | 0.15 | | 0.09 |
| Example 11 | 10 | 1.46 | 44 | 48 | 0.29 | 88 | 12 | 0.16 | 0.16 | |
| Comparative ex1 | 11 | 2.74 | 38 | 48 | 0.40 | 96 | 23 | 0.20 | | 0.19 |
| Comparative ex2 | 11 | 2.54 | 22 | 33 | 0.28 | 94 | 23 | 0.182 | | 0.25 |
| Comparative ex3 | 12 | 2.84 | 42 | 41 | 0.22 | 89 | 28 | 0.26 | 0.26 | |

The invention claimed is:

1. Coating composition for the manufacture of a car wash-resistant coating comprising at least one hydroxyl-functional binder selected from the group of hydroxyl-functional acrylic binders and hydroxyl-functional polyester binders and one or more cross- linkers reactive with the reactive groups of the binder, wherein the binder and cross-linkers are selected such that, after curing to a coating, the coating has an initial gloss of at least 81 GU and a loss of gloss (LoG) of less than 0.18, the loss of gloss being determined by the formula (I)

$$LoG = A + B \cdot E'\cdot(X)^{-1} \cdot 10^{(C \cdot \Delta Tg)} + D \cdot (E')^{-0.5} \quad (I)$$

wherein A=0.0132, B=1.0197, C=0.0113, and D=0.0566, E' reflects the tensile storage modulus at 40° C. in GPa, ΔTg the width of the glass transition temperature in °C., and X the cross-link density parameter in kPa/K, all three parameters determined in a DMTA test at 11 Hz and a heating rate of 5° C./min. and wherein, in case the at least one hydroxyl-functional binder is an acrylic binder, the acrylic binder comprises (1) at least 20 wt % based on the total weight of the monomers of hydroxyl group-containing monomers selected from the group of primary hydroxyl group-containing monomers or hydroxyl cycloalkyl group-containing monomers, this acrylic binder comprises (2) more than 10 mole % of monomers selected from the group of non-OH-functional low Tg monomers with a monomer Tg not exceeding 253K for acrylic non-OH-functional monomers, or not exceeding 293 K for methacrylic or non-acrylic non-OH-functional monomers, and wherein (3) the average number of atoms between the polymeric backbone of the acrylic binder and the oxygen atom of the hydroxyl group is at least 6, and (4) the acrylic binder has an OHV value of between 80 and 250 mg KOH/g.

2. A coating composition according to claim 1 wherein the at least one hydroxyl-functional binder is a hydroxyl-functional polyester binder and the at least one cross-linker is an amino-functional cross-linker, an isocyanate-functional cross-linker, or a blocked isocyanate-functional cross-linker, wherein the binder and the cross-linker together amount to at least 90 wt % of the solids content of the coating composition and give a L1 value of less than 0.18, L1 being calculated according to formula (II):

$$L1 = A1 + A2 \cdot (Mn)^{-1} + A3 \cdot CL + A4 \cdot MF + A5 \cdot NCO + A6 \cdot CL \cdot (Mn)^{-1} + A7 \cdot (MF)^2 + A8 \cdot MF \cdot NCO \quad (II)$$

wherein Mn represents the number average molecular weight of all hydroxyl-functional binders in the composition, CL the carbon length, MF the weight fraction of the amino cross-linker on total solids in the coating composition, NCO is defined as the total concentration of NCO groups present in the cured coating composition expressed in mmole NCO groups/g, wherein A1=−0.474, A2=457, A3=0.343, A4=2.17, A5=0.205, A6=−812, A7=−2.37, A8 =−0.656, and wherein the at least one hydroxyl-functional polyester binder has an OHV value between 50 and 350 mg KOH/g.

3. A coating composition according to claim 1 wherein the at least one binder is a hydroxyl-functional acrylic binder and the at least one cross-linker is an amino- functional cross-linker or an isocyanate-functional cross-linker, wherein the binder and the cross- linker together amount to at least 90 wt % of the solids content of the coating composition and give a L2 value of less than 0.18, L2 being calculated according to formula (III)

$$L2 = B1 + B2 \cdot TG + B3 \cdot MW + B4 \cdot OHL + B5 \cdot LPF + B6 \cdot MF + B7 \cdot NCO + B8 \cdot TG \cdot OHL + B9 \cdot MW \cdot MF + B10 \cdot MW \cdot NCO + B11 \cdot OHL \cdot NCO + B12 \cdot (LPF)^2 + B13 \cdot OHL \cdot MF \quad (III)$$

wherein TG represents the weight average theoretical glass transition temperature of all acrylic binders, MW the weight average molecular weight of all hydroxyl-functional binders in the composition, OHL the weight averaged hydroxyl length of all hydroxyl-functional acrylic binders, LPF the weight-averaged low polar fraction of low-Tg monomers in the acrylic binder, MF the weight fraction of the amino cross-linker on total solids in the coating composition, NCO is defined as the total concentration of NCO groups present in the cured coating composition expressed in mmole NCO groups/g, B1=−1.0776, B2=0.00354, B3=−0.0000818, B4=0.2728, B5=−0.17266, B6=1.304, B7=0.1354, B8=−0.000373, B9=0.000269, B10=0.00004066, B11=−0.08487, B12=0.2878, B13=−0.6037, and wherein the at least one hydroxyl-functional acrylic binder has an OHV value between 80 and 250 mg KOH/g.

4. A coating composition according to any one of claims 1 to 3 wherein both a hydroxyl-functional polyester binder and an acrylic binder are present, wherein the at least one cross-linker is an amino-functional cross-linker or an isocyanate-frmnctional cross-linker, wherein both the polyester binder and the acrylic binder are present in more than 10 wt % of the solids content of the coating composition and give a L3 value of less than 0.18, L3 being calculated according to formula (IV)

$$L3 = C1 \cdot L1 + C2 \cdot L2 \quad (IV)$$

wherein C1 represents the total weight percentage of polyester binder, C2 the total weight percentage of the acrylic binder on total solids content of binders in the coating composition, Li is calculated according to claim 2 and L2 according to claim 3, wherein L1 is calculated as if no acrylic binder is present and L2 is calculated as if no polyester binder is present.

5. A coating composition according to any one of claims 1 to 3, characterized in that it is substantially siloxane-free.

6. A coating composition according to any one of claims 1 to 3, characterized in that it is substantially pigment-free.

7. A coating composition according to any one of claims 1 to 3, characterized in that it is substantially free of nanoscopic particles.

8. A coating composition according to any one of claims 1 to 3, characterized in that the tensile storage modulus E' of the coating is below 2.9 Gpa.

9. A coating composition according to any one of claims 1 to 3, characterised in that the width of the glass transition temperature ΔTg of the coating is less than 80° C.

10. A coating composition according to any one of claims 1 to 3 wherein after curing the coating has i) an initial gloss of at least 81 GU; ii) a loss of gloss (LoG) of less than 0.18; iii) a cross-link efficiency $E_{XL}$ of at least 0.3U; and iv) a cross-link density parameter X of at least 50 KPa/K.

11. A coating composition according to any one of claims 1 to 3 wherein the cross-linker comprises a functionalised melamine compound.

12. A coating composition according to any one of claims 1 to 3 wherein the cross-linker comprises an isocyanate- or blocked-isocyanate functional compound.

13. A coating composition according to any one of claims 1 to 3 comprising a lactone as a chain extender.

14. A coating composition according to any one of claims 1 or 3 wherein the acrylic binder comprises at least 10 wt % based on the total weight of the monomers of low polar monomers.

15. A coating composition according to any one of claims 1 or 3 wherein the hydroxyl groups in the acrylic binder originate for at least 60 mole % from hydroxyalkyl (meth)acrylates or the reaction product of a hydroxy-alkyl(meth)acrylate and a lactone.

16. Kit of parts for the manufacture of a car wash-resistant coating, comprising a first part comprising at least one cross-linker and a second part comprising at least one hydroxyl-functional binder, wherein the at least one cross-linker is a cross-linker according to claim 1 and the at least one hydroxyl-functional binder is a hydroxyl-functional binder according to claim 1 and wherein the coating composition is characterised in that after curing the coating has i) an initial gloss of at least 81 GU and a loss of gloss (LoG) of less than 0.18, the loss of gloss being determined by the formula (I)

$$LoG = A + B \cdot E' \cdot (X)^{-1} \cdot 10^{(C \cdot \Delta Tg)} + D \cdot (E')^{-0.5} \quad (I)$$

wherein A=0.0132, B=1.0197, C=0.0113, and D=0.0566, E' reflects the tensile storage modulus at 40° C. in GPa, ΔTg the width of the glass transition temperature in °C., and X the cross-link density parameter in kPa/K, all three parameters determined in a DMTA test at 11 Hz and a heating rate of 5° C./mm.

17. Method to prepare a car wash-resistant coating, characterised in that a coating composition according to any one of claims 1 to 3 is applied to a substrate and in a subsequent step is cured, wherein after curing the coating has an initial gloss of at least 81 GU and a loss of gloss (LoG) of less than 0.18, the loss of gloss being determined by the formula (I)

$$LoG = A + B \cdot E' \cdot (X)^{-1} \cdot 10^{(C \cdot \Delta Tg)} + D \cdot (E')^{-0.5} \quad (I)$$

wherein A=0.013, B=1.02, C=0.011, and D=0.057, E' reflects the tensile storage modulus at 40° C. in GPa, ΔTg the width of the glass transition temperature in °C., and X the cross-link density parameter in kPa/K, all three parameters determined in a DMTA test at 11 Hz and a heating of 5° C./min.

18. A method according to claim 17 wherein the coating is cured at a temperature of at least 60° C.

19. A method according to claim 17 wherein the at least one hydroxyl-functional binder is reacted with a chain extender.

20. Articles selected from the group consisting of motorcycle body parts, car body parts, train body parts, bus body parts, truck body parts, and aeroplane body parts that are at least partly coated with a coating manufactured from a coating composition according to claim 1.

21. Articles selected from the group consisting of motorcycle body parts, car body parts, train body parts, bus body parts, truck body parts, and aeroplane body parts that are at least partly coated with a coating manufactured from a kit of parts according to claim 16.

* * * * *